United States Patent
Matsumoto et al.

(10) Patent No.: US 8,299,130 B2
(45) Date of Patent: Oct. 30, 2012

(54) AQUEOUS DISPERSION; RECORDING LIQUID, IMAGE-FORMING METHOD, AND IMAGE-FORMING APPARATUS, USING THE SAME; AND PRODUCTION METHOD OF THE AQUEOUS DISPERSION, AND INKJET INK OBTAINED FROM THE METHOD

(75) Inventors: Jun Matsumoto, Kanagawa (JP); Ryo Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 908 days.

(21) Appl. No.: 12/289,498

(22) Filed: Oct. 29, 2008

(65) Prior Publication Data

US 2009/0130308 A1 May 21, 2009

(30) Foreign Application Priority Data

Oct. 30, 2007 (JP) ................ 2007-282267

(51) Int. Cl.
*C09D 11/02* (2006.01)
(52) U.S. Cl. ....... 516/77; 427/256; 347/100; 106/31.25; 106/31.28
(58) Field of Classification Search .......... 427/256; 347/100; 106/31.25, 31.28; 516/77
See application file for complete search history.

(56) References Cited

U.S. PATENT DOCUMENTS

| | | | | |
|---|---|---|---|---|
| 4,954,429 A | * | 9/1990 | Urata | 430/503 |
| 6,110,266 A | * | 8/2000 | Gonzalez-Blanco et al. | 106/31.65 |
| 2002/0173610 A1 | * | 11/2002 | Aert et al. | 526/303.1 |
| 2006/0124032 A1 | * | 6/2006 | Ichinose et al. | 106/400 |
| 2007/0012221 A1 | | 1/2007 | Maeta et al. | |

FOREIGN PATENT DOCUMENTS

| | | | |
|---|---|---|---|
| EP | 1 364 997 A | | 11/2003 |
| EP | 1 693 423 A | | 8/2006 |
| JP | 04-224872 A | | 8/1992 |
| JP | 09-087540 A | | 3/1997 |
| JP | 09-176507 A | | 7/1997 |
| JP | 10-110111 | | 4/1998 |
| JP | 2004-43776 | | 2/2004 |
| JP | 2004-091560 A | | 3/2004 |
| JP | 2006-342316 | | 12/2006 |
| JP | 2007-119586 | | 5/2007 |
| JP | 2007-231247 A | | 9/2007 |
| WO | WO 2007/013475 A1 | | 2/2007 |
| WO | WO 2007/013599 A1 | | 2/2007 |
| WO | WO 2007/091712 A1 | | 8/2007 |

* cited by examiner

*Primary Examiner* — Margaret Moore
(74) *Attorney, Agent, or Firm* — Jean C. Edwards, Esq.; Edwards Neils PLLC

(57) ABSTRACT

An aqueous dispersion, having particles of a water-insoluble colorant containing at least one pigment, with the particles being dispersed in a medium containing therein both water and a dispersing agent, wherein the water-insoluble colorant has a crystalline structure, and an average particle diameter of the particles is in the range of from 5 nm to 40 nm, and a monodispersity of the particles is 1.5 or less.

9 Claims, No Drawings

AQUEOUS DISPERSION; RECORDING LIQUID, IMAGE-FORMING METHOD, AND IMAGE-FORMING APPARATUS, USING THE SAME; AND PRODUCTION METHOD OF THE AQUEOUS DISPERSION, AND INKJET INK OBTAINED FROM THE METHOD

CROSS-REFERENCE TO RELATED APPLICATIONS

The present application claims priority from Japanese Patent Application No. 2007-282267, filed Oct. 30, 2007, the contents of which are herein incorporated by reference in their entirety.

FIELD OF THE INVENTION

The present invention relates to an aqueous dispersion, a recording liquid, an image-forming method, and an image-forming apparatus, each of which uses the aqueous dispersion, and a production method of the aqueous dispersion, and an inkjet ink obtained from the production method.

BACKGROUND OF THE INVENTION

According to an inkjet recording method, high speed recording can be performed with a high freedom degree of imaging pattern and a low noise at the time of recording. Further, image recording can be performed at low cost. Still further, the inkjet recording method has advantages such that color recording can be readily performed. Therefore, recently the inkjet recording method is rapidly spreading and further developing. As an inkjet recording ink for the method, hitherto a dye ink, in which a water-soluble dye is dissolved in an aqueous medium, has been widely used. However, the dye ink is poor in water resistance and weather resistance of the resultant printed article. Therefore, a pigment ink, which has a potential to improve the above problems, has been studied.

However, pigments are often inferior to dyes in terms of discharge (emission) property from a nozzle of inkjet printer head. Besides, pigments are not in a single molecule state like dyes, but in a particle state. Accordingly, owing to scattering and reflection caused by pigments, absorption spectra of pigments are ordinarily broader than those of dyes. As a result, there is a tendency that the image formed from a pigment ink generally has lower transparency and lower color formation efficiency than those of the image formed from a dye ink. A means for resolving these problems is to reduce the size of particles. It has been desired to make the pigment into fine particles so that light scattering would be reduced and the particles would show as good transparency as dyes. Formation of fine particles of pigment is ordinarily performed by a mechanical force using a dispersion machine such as a sand mill, a roll mill, and a ball mill. However, the method of using such a mechanical force can pulverize pigment into a size of about 100 nanometers at the best, which is a vicinity of a primary particle size. Therefore, this method can hardly cope with a demand for further size reduction of particles (JP-A-10-110111 ("JP-A" means unexamined published Japanese patent application)). Further, as a desired size of particles becomes finer, not only it takes longer time to disperse them and requires greater costs but also it becomes more difficult to obtain particles with a uniform quality.

Recently, some other methods are proposed, which includes a method of preparing fine particles of pigments by once dissolving the particles in a solvent to form a solution and then forming (depositing) fine particles using the solution, and a method of concentrating organic particles contained therein (JP-A-2004-43776, JP-A-2006-342316, and JP-A-2007-119586). The thus-obtained dispersion of organic pigment particles shows a reduced light scattering and a higher transparency than the dispersion prepared by an ordinary pulverizing method. However, the thus-obtained fine particles having a particle diameter in nanometer order still have problems: it is so difficult to impart stability to the dispersion that fine particles aggregate with each other in the lapse of time, and resultantly viscosity increases. Further, the problem that light fastness deteriorates by use of fine particles has not been solved yet.

SUMMARY OF THE INVENTION

The present invention resides in an aqueous dispersion, which comprises particles of a water-insoluble colorant containing at least one pigment, with the particles being dispersed in a medium containing therein both water and a dispersing agent, wherein the water-insoluble colorant has a crystalline structure, and an average particle diameter of the particles is in the range of from 5 nm to 40 nm, and a monodispersity of the particles is 1.5 or less.

The present invention further resides in a recording liquid prepared by using the aqueous dispersion, wherein the water-insoluble colorant is contained in an amount of from 0.1% by mass to 15% by mass of the recording liquid.

The present invention further resides in an image-forming method which comprises applying the recording liquid to a medium, thereby recording an image.

The present invention further resides in an image-forming apparatus which comprises a means that applies the recording liquid to a medium, thereby to record an image.

The present invention further resides in a method of producing an aqueous dispersion containing a water-insoluble colorant, which comprises: (i) a step of dissolving a water-insoluble colorant containing at least one pigment, in an aprotic and water-soluble organic solvent containing a dispersing agent, in the presence of an alkali, to prepare a solution of the pigment, (ii) a step of mixing the resultant solution with an aqueous solvent, to prepare a dispersion in which particles of the water-insoluble colorant are dispersed in a medium containing water, (iii) a step of forming a soft aggregate containing the water-insoluble colorant particles from said dispersion, and then separating or concentrating the soft aggregate from the dispersion, (iv) a step of filtrating and washing the soft aggregate with a particular organic solvent, and (v) a step of re-dispersing the soft aggregate.

The present invention resides in an inkjet ink containing the aqueous dispersion prepared by the production method.

Other and further features and advantages of the invention will appear more fully from the following description.

DETAILED DESCRIPTION OF THE INVENTION

According to the present invention, there is provided the following means:

(1) An aqueous dispersion, comprising particles of a water-insoluble colorant containing at least one pigment, with the particles being dispersed in a medium containing therein both water and a dispersing agent, wherein the water-insoluble colorant has a crystalline structure, and an average particle diameter of the particles is in the range of from 5 nm to 40 nm, and a monodispersity of the particles is 1.5 or less.

(2) The aqueous dispersion as described in (1), wherein the water-insoluble colorant has a crystalline structure with a crystallite diameter of 20 Å to 400 Å.

(3) The aqueous dispersion as described in (1) or (2), wherein the water-insoluble colorant is a quinacridone-series pigment.

(4) A recording liquid prepared by using the aqueous dispersion as described in any one of (1) to (3), wherein the water-insoluble colorant is contained in an amount of from 0.1% by mass to 15% by mass of the recording liquid.

(5) The recording liquid as described in (4), wherein the recording liquid is an inkjet recording liquid.

(6) An image-forming method, comprising: applying the recording liquid as described in (4) or (5) to a medium, thereby recording an image.

(7) An image-forming apparatus, comprising a means for applying the recording liquid as described in (4) or (5) to a medium, thereby to record an image.

(8) A method of producing an aqueous dispersion containing a water-insoluble colorant, which comprises: (i) a step of dissolving a water-insoluble colorant containing at least one pigment, in an aprotic water-soluble organic solvent containing a dispersing agent, in the presence of an alkali, to prepare a solution thereof, (ii) a step of mixing the resultant solution with an aqueous solvent, to prepare a dispersion in which particles of the water-insoluble colorant are dispersed in a medium containing water, (iii) a step of forming a soft aggregate containing the water-insoluble colorant particles from said dispersion, and then separating or concentrating the soft aggregate from the dispersion, (iv) a step of filtrating and washing the soft aggregate with a particular organic solvent, and (v) a step of re-dispersing the soft aggregate.

(9) The method of producing an aqueous dispersion as described in (8), wherein the dispersing agent is a polymer compound that is able to dissolve or disperse in the particular organic solvent.

(10) The method of producing an aqueous dispersion as described in (8) or (9), wherein the particular organic solvent is an ester-series solvent or a ketone-series solvent.

(11) The method of producing an aqueous dispersion as described in (10), wherein the ester-series solvent is ethyl lactate.

(12) An inkjet ink, containing the aqueous dispersion prepared by the production method as described in any one of (8) to (11).

The aqueous dispersion of the present invention contains particles of a water-insoluble colorant including at least one pigment. The organic pigment usable for the water-insoluble colorant is not limited in hue and structure thereof. Specifically, examples thereof include perylene-compound pigments, perynone-compound pigments, quinacridone-compound pigments, quinacridonequinone-compound pigments, anthraquinone-compound pigments, anthanthorone-compound pigments, benzimidazolone-compound pigments, condensed disazo-compound pigments, disazo-compound pigments, azo-compound pigments, indanthrone-compound pigments, indanthrene-compound pigments, quinophthalone-compound pigments, quinoxalinedione-compound pigments, metal-complex azo-compound pigments, phthalocyanine-compound pigments, triarylcarbonium-compound pigments, dioxazine-compound pigments, aminoanthraquinone-compound pigments, diketopyrrolopyrrole-compound pigments, naphthol AS compound pigments, thioindigo-compound pigments, isoindoline-compound pigments, isoindolinone-compound pigments, pyranthrone-compound pigments, isoviolanthrone-compound pigments, and mixtures of any two or more thereof.

More specifically, examples of the organic pigment include perylene-compound pigments, such as C.I. Pigment Red 179, C.I. Pigment Red 190, C.I. Pigment Red 224, C.I. Pigment Violet 29, or the like; perynone-compound pigments, such as C.I. Pigment Orange 43, C.I. Pigment Red 194 or the like; quinacridone-compound pigments, such as C.I. Pigment Violet 19, C.I. Pigment Violet 42, C.I. Pigment Red 122, C.I. Pigment Red 192, C.I. Pigment Red 202, C.I. Pigment Red 207, C.I. Pigment Red 209 or the like; quinacridonequinone-compound pigments, such as C.I. Pigment Red 206, C.I. Pigment Orange 48, C.I. Pigment Orange 49, or the like; anthraquinone-compound pigments, such as C.I. Pigment Yellow 147 or the like; anthanthrone-compound pigments, such as C.I. Pigment Red 168 or the like; benzimidazolone-compound pigments, such as C.I. Pigment Brown 25, C.I. Pigment Violet 32, C.I. Pigment Yellow 180, C.I. Pigment Yellow 181, C.I. Pigment Orange 36, C.I. Pigment Orange 62, C.I. Pigment Red 185, or the like; condensed disazo-compound pigments, such as C.I. Pigment Yellow 93, C.I. Pigment Yellow 94, C.I. Pigment Yellow 95, C.I. Pigment Yellow 128, C.I. Pigment Yellow 166, C.I. Pigment Orange 34, C.I. Pigment Orange 13, C.I. Pigment Orange 31, C.I. Pigment Red 144 (C.I. Number: 20735), C.I. Pigment Red 166, C.I. Pigment Red 219, C.I. Pigment Red 220, C.I. Pigment Red 221, C.I. Pigment Red 242, C.I. Pigment Red 248, C.I. Pigment Red 262, C.I. Pigment Brown 23, or the like; disazo-compound pigments, such as C.I. Pigment Yellow 13, C.I. Pigment Yellow 83, C.I. Pigment Yellow 188, or the like; azo-compound pigments, such as C.I. Pigment Red 187, C.I. Pigment Red 170, C.I. Pigment Yellow 74, C.I. Pigment Red 48, C.I. Pigment Red 53, C.I. Pigment Orange 64, C.I. Pigment Red 247, or the like; indanthrone-compound pigments, such as C.I. Pigment Blue 60, or the like; indanthrene-compound pigments, such as C.I. Pigment Blue 60, or the like; quinophthalone-compound pigments, such as C.I. Pigment Yellow 138, or the like; quinoxalinedione-compound pigments, such as C.I. Pigment Yellow 213, or the like; metal-complex azo-compound pigments, such as C.I. Pigment Yellow 129, C.I. Pigment Yellow 150, or the like; phthalocyanine-compound pigments, such as C.I. Pigment Green 7, C.I. Pigment Green 36, Pigment Green 37, Pigment Blue 16, C.I. Pigment Blue 75, C.I. Pigment Blue 15 (including 15:1, 15:6 or the like), or the like; triaryl carbonium-compound pigments, such as C.I. Pigment Blue 56, C.I. Pigment Blue 61, or the like; dioxazine-compound pigments, such as C.I. Pigment Violet 23, C.I. Pigment Violet 37, or the like; aminoanthraquinone-compound pigments, such as C.I. Pigment Red 177, or the like; diketopyrrolopyrrole-compound pigments, such as C.I. Pigment Red 254, C.I. Pigment Red 255, C.I. Pigment Red 264, C.I. Pigment Red 272, C.I. Pigment Orange 71, C.I. Pigment Orange 73, or the like; naphthol AS compound pigments, such as C.I. Pigment Red 187, C.I. Pigment Red 170, or the like; thioindigo-compound pigments, such as C.I. Pigment Red 88, or the like; isoindoline-compound pigments, such as C.I. Pigment Yellow 139, C.I. Pigment Orange 66, or the like; isoindolinone-compound pigments, such as C.I. Pigment Yellow 109, C.I. Pigment Yellow 110, C.I. Pigment Orange 61, or the like; pyranthrone-compound pigments, such as C.I. Pigment Orange 40, C.I. Pigment Red 216, or the like; or isoviolanthrone-compound pigments, such as C.I. Pigment Violet 31, or the like.

The aqueous dispersion of the present invention may be prepared preferably by the method including (1) a step of dissolving a water-insoluble colorant including at least one pigment in an aprotic water-soluble organic solvent containing a dispersing agent in the presence of alkali, to prepare a solution of the pigment, (2) a step of mixing the resultant solution with an aqueous solvent, to prepare a dispersion in which particles of the water-insoluble colorant are dispersed in a medium containing water, (3) a step of forming a soft aggregate containing the water-insoluble colorant particles from said dispersion, and then separating or concentrating the soft aggregate from the dispersion, (4) a step of filtrating and washing the soft aggregate with a particular organic solvent, and (5) a step of re-dispersing the soft aggregate.

Any kind of aprotic solvent may be used in the present invention, so long as the solvent is able to dissolve an organic pigment and a polymer compound in the presence of alkali. Aprotic solvents having 5% by mass or more of solubility to water are preferably used. Furthermore, aprotic solvents that can be freely mixed with water are preferable.

Specifically, preferable examples of the solvent include dimethylsulfoxide, dimethylimidazolidinone, sulfolane, N-methylpyrrolidone, N,N-dimethylformamide, acetonitrile, acetone, dioxane, tetramethylurea, hexamethylphosphoramide, hexamethylphosphoro triamide, pyridine, propionitrile, butanone, cyclohexanone, tetrahydrofuran, tetrahydropyran, ethyleneglycol diacetate, and γ-butyrolactone. Of these solvents, dimethylsulfoxide, N-methylpyrrolidone, N,N-dimethylformamide, dimethylimidazolidinone, sulfolane, acetone, acetonitrile, and tetrahydrofuran are preferable. Further, these solvents may be used singly or in a combination thereof.

A proportion of the aprotic solvent to be used is not particularly limited. However, it is preferred to use the solvent in the proportion of 2 parts by mass to 500 parts by mass, more preferably from 5 parts by mass to 100 parts by mass, with respect to 1 part by mass of the pigment respectively, in order to improve a dissolution state of the pigment, to form easily a pigment having a desired particle diameter, and to improve a color density of aqueous dispersion.

Examples of the alkali that can be contained in the above aprotic solvents include inorganic bases such as sodium hydroxide, calcium hydroxide, and barium hydroxide; and organic bases such as trialkylamine, diazabicycloundecene (DBU), and metal alkoxides. Among these, the inorganic bases are preferably used.

The amount of the base to be used is not particularly limited. In the case of the inorganic base, the amount thereof is preferably from 1.0 to 30 mole equivalents, more preferably from 2.0 to 25 mole equivalents, and particularly preferably from 3 to 20 mole equivalents, to the pigment. In the case of the organic base, the amount thereof is preferably from 1.0 to 100 mole equivalents, more preferably from 5.0 to 100 mole equivalents, and particularly preferably from 20 to 100 mole equivalents, to the pigment.

In the present invention, the "aqueous solvent" refers to water alone, or a mixed solvent of water and an organic solvent soluble in water. The addition of the organic solvent is preferably used, for example, (i) in the case where only water is not sufficient for uniformly dissolving a pigment and a dispersing agent, (ii) in the case where only water is not sufficient for obtaining viscosity required for the flow through a flow path, and the like. In the case of alkaline, for example, the organic solvent is preferably an amide series solvent or a sulfur-containing compound solvent, more preferably the sulfur-containing-compound solvent and particularly preferably dimethylsulfoxide (DMSO). In the case of acidic, the organic solvent is preferably a carboxylic acid series solvent, a sulfur-containing compound solvent or a sulfonic acid series solvent, more preferably a sulfonic acid series solvent, and particularly preferably methanesulfonic acid. Additionally, an inorganic compound salt and a dispersing agent as described below may be dissolved into the aqueous solvent as required.

In this case, the embodiment wherein a solution of a water-insoluble colorant (organic pigment) homogeneously dissolved therein and an aqueous solvent are mixed is not particularly limited. Examples of the embodiment include an embodiment in which a water-insoluble colorant solution is added to an aqueous solvent with being stirred, and an embodiment in which a water-insoluble colorant solution and an aqueous solvent are each delivered to a certain length of flow path in the same longitudinal direction, and both the solution and the solvent contact with each other in the course of getting through the flaw path, thereby to form (deposit) fine particles of water-insoluble colorant. With respect to the former (the embodiment of stirring and mixing), it is especially preferred to use an embodiment in which a feed pipe or the like is introduced in an aqueous solvent so that a water-insoluble colorant solution is fed from the pipe for addition from inside of the solvent. More specifically, the addition from inside of the solvent can be performed by using an apparatus described in International Publication WO 2006/121018 pamphlet, paragraphs 0036 to 0047. With respect to the latter (the embodiment of mixing both the liquid and the solvent by using the flow path), there can be used microreactors described in JP-A-2005-307154, paragraphs 0049 to 0052 and FIGS. 1 to 4, and JP-A-2007-39643, paragraphs 0044 to 0050.

A condition for formation (deposition) of the particles of the water-insoluble colorant is not particularly limited, and can be selected from a range from a normal pressure condition to a subcritical or supercritical condition. The temperature at which the particles are prepared under normal pressure is preferably −30 to 100° C., more preferably −10 to 60° C., and particularly preferably 0 to 30° C. A mixing ratio of the water-insoluble colorant solution to the aqueous solvent is preferably 1/50 to 2/3, more preferably 1/40 to 1/2, and particularly preferably 1/20 to 3/8 in volume ratio. The concentration of the particles of the water-insoluble colorant in the mixed liquid is not particularly limited, but the amount of the particles of the water-insoluble colorant is preferably 10 to 40,000 mg, more preferably 20 to 30,000 mg, and particularly preferably 50 to 25,000 mg, per 1,000 ml of the solvent.

As the dispersing agent, it is possible to properly use a material that is soluble in an aprotic organic solvent containing the aforementioned water-insoluble colorant in the presence of alkali and also that is able to impart a dispersing effect to an organic pigment in an aqueous solution. It is preferable to use a surfactant or polymer compound, having at least one hydrophilic component selected from the group consisting of a carboxylic acid group, a sulfonic acid group, a phosphoric acid group, a hydroxyl group, and an alkyleneoxide group. More preferable dispersing agent is a compound that can dissolve stably together with organic pigments in an aprotic organic solvent in the presence of alkali. When a hydrophilic component of the dispersing agent is composed of only other group(s) than the above groups, such as a primary, secondary, or tertiary amino group and a quaternary ammonium group, a dispersion property is sufficient in aqueous dispersion. However, a degree of dispersion stability sometimes becomes relatively small. Besides, in the conventional pigment dispersion method, it is necessary to think out, for example, to select a dispersing agent that can efficiently contact with a surface of the pigments dispersed in a medium. In the present invention, both the pigment and the dispersing agent are present in the dissolution state in the medium, so that a desired function between them can be easily achieved. As a result, no limitation to the dispersing agent owing to contact efficiency on the pigment surface is required, which is different from the conventional pigment dispersion method. Accordingly, a wide range of dispersing agents may be used in the present invention.

Specifically, the surfactant that can be used in the present invention may be properly selected from conventionally known surfactants and derivatives thereof, including anionic surfactants such as alkylbenzene sulfonic acid salts, alkylnaphthalene sulfonic acid salts, higher fatty acid salts, sulfonic acid salts of higher fatty acid esters, sulfuric acid ester salts of higher alcohol ether, sulfonic acid salts of higher alcohol ether, alkylcarboxylic acid salts of higher alkylsulfonamide, and alkylphosphoric acid salts; nonionic surfactants such as polyoxyethylene alkylethers, polyoxyethylene alkylphenylethers, polyoxyethylene fatty acid esters, sorbitan fatty acid esters, ethyleneoxide adducts of acetylene glycol, ethyleneoxide adducts of glycerol, and polyoxyethylene sorbitan fatty acid esters; and in addition to the above, amphoteric surfactants such as alkyl betaines and amido betaines; and silicone-based surfactants and fluorine-based surfactants.

Specific examples of the polymer dispersing agent include polyvinyl pyrrolidone, polyvinyl alcohol, polyvinyl methyl ether, polyethylene oxide, polyethyleneglycol, polypropyleneglycol, and polyacrylamide. Polyvinyl pyrrolidone is preferably used.

Further, examples of the polymer compounds that can be used as other dispersing agents include block-copolymers, random copolymers, or graft copolymers, or modified materials of these copolymers and salts thereof, each of which is composed of at least two monomer components selected from styrene, styrene derivatives, vinylnaphthalene, vinylnaphthalene derivatives, aliphatic alcohol esters of $\alpha,\beta$-ethylenycally unsaturated carboxylic acid, acrylic acid, acrylic acid derivatives, methacrylic acid, methacrylic acid derivatives, maleic acid, maleic acid derivatives, alkenyl sulfonic acids, vinyl amines, allyl amines, itaconic acid, itaconic acid derivatives, fumaric acid, fumaric acid derivatives, vinyl acetate, vinyl phosphoric acid, vinyl pyrrolidone, acrylamide, N-vinyl acetoamide, N-vinylformamide and N-vinylformamide derivatives, with the proviso that at least one of the monomers has a functional group that becomes a carboxylic acid group, a sulfonic acid group, a phosphoric acid group, a hydroxyl group or an alkyleneoxide.

In more detail, the polymer compounds that can be used in the present invention are preferably composed of a hydrophilic group portion and a hydrophobic group portion. As the polymer compounds, it is preferable to use copolymers that can be obtained by copolymerizing a hydrophilic monomer component and a hydrophobic monomer component. When polymers (polymer compounds) that are composed of only hydrophobic monomer components are used, it sometimes becomes difficult to impart good dispersion stability to a water-insoluble colorant. It should be noted that the term "hydrophilic" means a good affinity with water and a high water solubility, whereas the "hydrophobic" means a poor affinity with water and a sparse water solubility.

Examples of the hydrophobic monomer component include monomer components having, as a structure unit, a hydrophobic unit such as an isobutyl group, a t-butyl group, a phenyl group, a biphenyl group, and a naphthyl group. From a viewpoint of imparting high dispersion stability to the water-insoluble colorant, preferred are block segments having, as a recurring unit, a hydrophobic monomer such as styrene or t-butyl methacrylate. However, the hydrophobic monomer component is not limited to these materials.

Examples of the hydrophilic monomer component include monomer components containing, as a structure unit, a hydrophilic unit having a functional group such as the aforementioned carboxylic acid group, sulfonic acid group, phosphoric acid group, hydroxyl group, and alkyleneoxide. Specifically, examples of the hydrophilic monomer include acrylic acid, methacrylic acid; carboxylic acid salts such as inorganic salts or organic salts of acrylic acid or methacrylic acid; polyethyleneglycol macromonomers; vinyl alcohol, and 2-hydroxyethylmethacrylate. However, the hydrophilic monomer component is not limited to these materials.

The above copolymers may have any form such as block-copolymers, random copolymers, and graft copolymers. Use of the block-copolymers, or graft copolymers is especially preferable because those copolymers impart an excellent dispersibility to a water-insoluble colorant.

As the polymer compound that are used as a dispersing agent, there can be preferably used natural polymer compounds such as albumin, gelatin, rosin, shellac, starch, gum Arabic, and sodium alginate; and their modified compounds. Further, these dispersing agents may be used singly, or in a combination thereof. A ratio of these dispersing agents to be used is not particularly limited. However, it is preferred to use the dispersing agent in a proportion of 0.05 parts by mass or more with respect to 1 part by mass of the organic pigment, and 50 parts by mass or less with respect to 100 parts by mass of the aprotic organic solvent. When the proportion of the dispersing agent is too large with respect to the aprotic organic solvent, it is sometimes difficult to make the dispersing agent dissolve in the solvent. On the other hand, when the proportion of the dispersing agent is too small with respect to the organic pigment, it is sometimes difficult to achieve a sufficient dispersion effect.

In order to improve resistance to light when the dispersion of the present invention is used as an ink that is described below, the above-described dispersing agents can be preferably used. However, it is especially preferred to use a polymer dispersing agent or a polymer compound, each of which is soluble or dispersible in a particular solvent that is used for a cleaning (washing) process that is described below, in consideration of improving resistance to light and maintaining at a low viscosity level even though the dispersion are enriched. The molecular weight of the polymer dispersing agent or the polymer compound is not particularly limited, but is preferably in the range of 500 to 1,000,000, and more preferably from 1,000 to 1,000,000 in terms of the mass average molecular weight respectively. When the molecular weight is too small, the polymer cannot function as a dispersing agent. On the other hand, when the molecular weight is too large, entanglement among polymeric chains becomes too large. As a result, it becomes difficult for them to serve as a dispersing agent, which occasionally makes it difficult to maintain a good dispersion state. It should be noted that when described simply as a "molecular weight" in the present invention, the molecular weight means a mass average molecular weight, and the mass average molecular weight, unless indicated otherwise, means an average molecular mass calculated in terms of polystyrene that is measured by gel permeation chromatography (carrier: tetrahydrofuran). It should be also noted that the term "dispersion" that is used in the present invention means a composition having prescribed fine particles dispersed therein. The form of the dispersion is not particularly limited. The dispersion is used as a meaning to embrace a liquid composition (dispersion liquid), a past-like composition, and a solid composition.

The amount of the dispersing agent that is contained in a solution of a water-insoluble colorant dissolved therein is preferably in the range of 0.1 part by mass to 1000 parts by mass, more preferably from 1 part by mass to 500 parts by mass, and most preferably from 10 parts by mass to 250 parts by mass, with respect to 100 parts by mass of pigment, in order to further improve an uniform dispersity and a storage stability of the pigment. A too-small amount of the dispersing agent sometimes has no effect to improve dispersion stability of organic pigment fine particles. There is no particular limitation on an amount of the dispersing agent that is contained in the aqueous dispersion of the present invention. However, it is practical to include the dispersing agent in an amount of 10 parts by mass to 1000 parts by mass, with respect to 100 parts by mass of pigment.

(Average Particle Diameter from Observation by Transmission Electron Microscope)

In the present invention, a form of the water-insoluble colorant particles that are contained in the dispersion is observed by using a transmission electron microscope (TEM), to calculate an average particle diameter thereof, in the following manner: The dispersion (dispersion liquid) containing fine particles of water-insoluble colorant is diluted. The diluted dispersion is dropped onto a Cu 200 mesh to which a carbon film is attached, and then the fine particles are dried on the mesh. The diameter of each of particles (e.g. 500 particles) is measured from images of the particles photographed to 100,000 times using TEM (1200EX, manufactured by JEOL Ltd.), and then an average particle diameter is calculated. At this time, because the dispersion is dried on the Cu 200 mesh as described above, even if the water-insoluble colorant is in a state well dispersed in the dispersion, there is a case where particles of the water-insoluble colorant apparently aggregate during the drying step, which makes it difficult to discriminate an accurate particle diameter. In this case, an average particle diameter is calculated by using isolated particles (e.g. 500 particles) that are not piled on other particles. When the particles of the water-insoluble colorant are not spherical, the major axis (the longest diameter of the particle) is measured.

In the present invention, an average particle diameter of the water-insoluble colorant obtained by observation with a transmission electron microscope (TEM observation) is preferably in the range of 5 nm to 40 nm, more preferably from 10 nm to 30 nm, and especially preferably from 10 nm to 25 nm. When the average particle diameter is too small, it is sometimes difficult to keep a stable dispersion state in the dispersion for a long time, or it is sometimes difficult to obtain excellent light resistance. On the other hand, when the average particle diameter is too large, problems sometimes occur, which includes deterioration of discharge stability or reduction in color density owing to scattering.

(Average Particle Diameter According to a Dynamic Light-Scattering Method)

In the present invention, a dispersion state of the water-insoluble colorant may be also evaluated according to a dynamic light-scattering method. Thereby, an average particle diameter of the water-insoluble colorant can be calculated. The principle of evaluation is detailed below. Particles with the diameter ranging from about 1 nm to about 5 μm are momentarily changing their position and direction in Brownian motion such as translation and rotation. Accordingly, by irradiating a laser light to these particles and then detecting the resultant scattered light, fluctuation of the scattered light intensity depending on Brownian motion is observed. By observing the fluctuation of the scattered light intensity with respect to time, a speed (diffusion coefficient) of the particles in Brownian motion is calculated and the size of the particles can be known.

Applying the above principle, an average particle diameter of the water-insoluble colorant is measured. When the measured value is similar to the average particle diameter that is obtained from the TEM observation, it means that the particles in a liquid are in monodispersion (the situation in which particles are neither bonding nor aggregating to each other). Namely, particles are each dispersed in a dispersion medium with keeping an interval between particles, so that they can move singly and independently.

In the present invention, it has been found that the arithmetic average particle diameter of the water-insoluble colorant in a dispersion medium measured according to the dynamic light-scattering method is almost the same level as the average particle diameter obtained from TEM observation. Accordingly, a preferable range of the average particle diameter of the water-insoluble colorant particles is almost equivalent to that measured by the aforementioned TEM observation. However, even though particles are completely mono-disperse in a dispersion medium, an error of measurement or the like sometimes causes a significant difference between the average particle diameter obtained from TEM observation and the average particle diameter according to a dynamic light-scattering method. For example, it is required that a concentration of the solution at the time of measurement is suitable to the performance and the scattered light detection system of a measuring apparatus. Unless the measurement is conducted at a concentration that is able to secure a sufficient transmission amount of light, an error occurs. Further, when nanoparticles are measured, the obtainable signal intensities are so feeble that they are strongly affected by dusts, which cause errors. Therefore, it is necessary to give a care to pre-treatment of the sample and purity of environment for measurement. When nanoparticles are measured, a laser light source having a transmission output of 100 mV or more is suitable for enhancing intensities of scattered light. In the present invention, unless indicated otherwise, the simply described "average particle diameter" means the aforementioned average particle diameter measured by using a TEM.

Further, it is preferable that a particle diameter distribution of the water-insoluble colorant in a dispersion medium according to the present invention is monodisperse. Monodisperse particles is advantageous because adverse influence owing to light-scatting at large-sized particles can be reduced. As an indicator that is used to evaluate dispersity of the dispersion, for example, there can be used a difference between the diameter (D90) of particles that occupy 90% by number and the diameter (D10) of particles that occupy 10% by number of the total particle numbers, in the following integral equation of the particle diameter distribution function with respect to the arithmetic average particle diameter that is obtained according to the dynamic light-scattering method:

$$dG=f(D)\times d(D)$$

(Wherein, G represents the number of particles; and D represents a primary particle diameter.)

In the present invention, the above difference between the particle diameter (D90) and the particle diameter (D10) is preferably 45 nm or less, and more preferably from 1 nm to 30 nm, and especially preferably from 1 nm to 20 nm. It should be noted that the above method can be suitably used in the particle diameter distribution curve that is prepared by using the particle diameter that is obtained from observation by using a transmission electron microscope.

Further, as another indicator that is used to evaluate dispersity, there can be also used a ratio of a volume average particle diameter (Mv) to a number average particle diameter (Mn), namely a ratio of (Mv)/(Mn). Both Mv and Mn are obtained by the dynamic light-scattering method. In the aqueous dispersion of the present invention, the aforementioned ratio (Mv)/(Mn) of the water-insoluble colorant is preferably 1.5 or less, and more preferably 1.4 or less, and still more preferably 1.3 or less.

(Definition of Crystallite Diameter)

Measurement and calculation of the crystallite diameter are not particularly limited. The phrase "the water-insoluble colorant has a crystalline structure" used in the present invention means that when the water-insoluble colorant in a dispersion is subjected to a powder X-ray diffraction analysis, the results of analysis do not meet any one of the following (i) and (ii):

(i) A halo that is specific to amorphous (non-crystalline) substance is observed.
(ii) The crystallite diameter that is determined by the measuring method described below is less than 20 Å, or the substance is supposed to be amorphous.

In the present invention, the crystallite diameter is measured and calculated as follows:

First, X-ray diffraction analysis is performed by using Cu—Kα1 ray. Thereafter, in the 2θ range of 4 degrees to 70 degrees, a half width of a peak that shows the maximum intensity or a peak that has a sufficiently large intensity and can be discriminated from a peak(s) adjacent thereto, is measured. Then, the crystallite diameter is calculated according to the following Scherrer's equation:

$$D = K \times \lambda / (\beta \times \cos \theta)$$

wherein, D represents a crystallite diameter (Å, a size of crystallite), λ represents a measuring X-ray wavelength (Å), β represents an extent (radian) of a diffraction line dependent on a diameter of the crystal, θ represents a Bragg angle (radian) of the diffraction line, and K represents a constant which is variable depending on the constant of β, and D.

Generally, it is known that when a half width $\beta_{1/2}$ is used in place of β, K equals 0.9. Further, since the wavelength of Cu—Kα1 ray is 1.54050 Å, the crystallite diameter D in the present invention is calculated according to the following equation:

$$D = 0.9 \times 1.54050 / (\beta_{1/2} \times \cos \theta)$$

In this case, when a peak of the spectrum obtained by the measurement is so broad that a half width of the spectrum is difficult to make out, it is assumed that the crystallite diameter is less than 20 Å or the substance is in an amorphous state (non-crystalline).

In the aqueous dispersion of the present invention, the water-insoluble colorant has a crystalline structure. The crystallite diameter of the crystalline structure is preferably from 20 Å to 400 Å, and more preferably 20 Å to 300 Å. It is especially preferable that the crystallite diameter is 20 Å to 250 Å, from a viewpoint of reconciling light resistance with high color formation efficiency.

Further, it is especially preferable that the water-insoluble colorant has a crystallite diameter close to the particle diameter thereof in order to attain a high color forming efficiency and a high light resistance.

In the aqueous dispersion of the present invention, a content of the water-insoluble colorant is not particularly limited, but preferably in the range of from 0.01% by mass to 30% by mass, and more preferably from 1.0% by mass to 20% by mass, and especially preferably from 2.0% by mass to 12% by mass. It should be noted that in the present invention the term "dispersion" is used to mean a liquid composition (dispersion liquid), a semi-solid composition and a solid composition.

In the present invention, gases such as air or oxygen may coexist at the time of formation of pigment fine particles. For example, these gases may be used as an oxidant. The embodiment of making the gases coexist is not particularly limited. For example, the gases may be dissolved in an organic pigment solution and/or an aqueous solvent, in advance. Alternatively, the gases may be introduced to a reaction vessel separately from these liquids, and followed by contacting said gases with these liquids.

In the aqueous dispersion of the present invention, a mixture having particles of the water-insoluble colorant formed is subjected to an acid treatment that is specifically described below. Preferably, in the acid treatment, the acid is added during formation of aggregate, to form soft aggregate of the above particles. The "soft aggregation" herein used refers to as such a weak aggregation that can be re-dispersed, and the aggregate is sometimes called a floc. The acid-using treatment preferably includes steps of aggregation of pigment particles with an acid, separation of the resultant aggregate from a solvent (dispersing medium), concentration, solvent removal and desalting (deacidification). By making a system acidic, it enables to reduce electrostatic repulsion of particles owing to an acidic hydrophilic portion of the dispersing agent, and to aggregate the pigment particles.

As the acid that is used in the aggregation of particles, any acid may be used so long as the compound is able to make particles in the aqueous dispersion, which are in a state of fine particles that cannot be easily precipitated, aggregate in a form such as slurry, paste, powder-like, granular, cake-like (bulk), sheet-like, short (discontinuous) fiber-like or flake-like form, and able to efficiently separate the resultant aggregate from a solvent according to an ordinary separation method. As the acid, it is preferred to use an acid that forms a water-soluble salt with alkali. It is more preferable that the acid itself has a high solubility to water. In order to conduct desalting as efficiently as possible, it is preferable that the amount of acid used is as small as possible so long as the aqueous dispersion of the pigment particles aggregate in the amount of the acid. Examples of the acid include hydrochloric acid, sulfuric acid, nitric acid, acetic acid, phosphoric acid, trifluoroacetic acid, dichloroacetic acid, and methane sulfonic acid. Of these acids, hydrochloric acid, acetic acid, and sulfuric acid are particularly preferable. An aqueous dispersion of pigment particles that has been processed with the acid so as to be easily separable can be easily separated by using a centrifugal separator, a filter, a slurry liquid-solid separator or the like. At this time, a degree of desalting or solvent removal can be controlled by adding diluent water, or by increasing frequency of decantation and washing.

The thus-obtained soft aggregate can be used as a paste or slurry as it is, each of which has high water content. If necessary, it is also possible to use the soft aggregate in a form of fine powder that is obtained by drying the paste or slurry according to a drying method such as a spray-dry method, centrifugal separation drying method, a filter drying method, or a freeze-drying method.

In the aqueous dispersion of the present invention, a water-insoluble colorant has a crystalline structure. It is preferable to wash a soft aggregate with an organic solvent, in order to form the crystalline structure. A particular wash organic solvent that is used in this washing step is preferably an organic solvent that is able to dissolve or disperse the aforementioned dispersing agent. As the organic solvent, ester series solvents, ketone series solvents, alcoholic solvents, aromatic solvents and aliphatic solvents are preferable. Ester series solvents and ketone series solvents are more preferable. Ester series solvents are especially preferable. Examples of the ester series solvents include ethyl acetate, ethyl lactate, and 2-(1-methoxy)propyl acetate. Examples of the ketone series solvents include acetone, methyl ethyl ketone, methyl isobutyl ketone, and cyclohexanone. Examples of the alcoholic solvents include methanol, ethanol, and n-butanol. Examples of the aromatic solvents include benzene, toluene, and xylene.

Examples of the aliphatic solvents include n-hexane and cyclohexane. Among them, acetone and ethyl lactate are particularly preferable.

The time when the washing is carried out is not limited, so far as the washing is carried out after formation of the water-insoluble colorant fine particles. For example, it is preferred that a concentrated paste or separated powder of the above-described fine particles obtained from a soft aggregate is washed with the above-described particular organic solvent. In the washing treatment, the amount of the organic solvent used is not particularly limited, but it is preferred to use the organic solvent in the proportion of 0.01 parts by mass to 10,000 parts by mass with respect to 100 parts by mass of the pigment. The amount of the organic solvent (i.e. crystallizing and washing organic solvent) that is contained in the aqueous dispersion of the present invention is not particularly limited, but it is practical that the proportion of the organic solvent is in the range of 0.0001% by mass to 1% by mass.

In the dispersion of the present invention, it is preferred to re-disperse the soft aggregate. As the re-dispersion treatment, there can be exemplified an alkali treatment. Namely, it is preferred to neutralize the particles aggregated with using the acid, with alkali, and then to re-disperse the particles into water or the like with maintenance of a primary particle diameter at the time of formation of the particles. Since desalting and solvent removal have been already conducted, a concentrated base of aqueous dispersion containing a little impurity can be obtained. As the alkali used herein, any alkali can be used, so long as they act as a neutralizing agent for a dispersing agent having an acidic hydrophilic portion and enhance solubility to water. Specific examples of the alkali include various kinds of organic amines such as aminomethylpropanol, dimethylaminopropanol, dimethylethanolamine, diethyltriamine, monoethanolamine, diethanolamine, triethanolamine, butyldiethanolamine, and morpholine; alkali metal hydroxides such as sodium hydroxide, lithium hydroxide, and potassium hydroxide; and ammonia. They may be used solely or in a combination of two or more compounds.

The amount of the alkali used is not particularly limited within the range in which the soft aggregated particles can be re-dispersed stably in water. However, when the dispersion is used for end use such as a printing ink or inkjet printer ink, the alkali sometimes causes corrosion of various kinds of parts. Therefore, it is preferred to use the alkali in such an amount that pH is within the range of 6 to 12, and more preferably from 7 to 11.

When the soft aggregated particles are re-dispersed, re-dispersion can be easily performed by adding a water-soluble organic solvent. The organic solvent used is not particularly limited. Specific examples of the organic solvent include lower alcohols such as methanol, ethanol, n-propanol, isopropanol, n-butanol, isobutanol, and tert-butanol; aliphatic ketones such as acetone, methylethylketone, methylisobutylketone, and diacetone alcohol; ethylene glycol, diethylene glycol, triethylene glycol, glycerol, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, N-methylpyrrolidone, 2-pyrrolidone, N,N-dimethylformamide, dimethylimidazolidinone, dimethylsulfoxide, and N,N-dimethylacetoamide. These solvents may be used singly or in a combination of two or more compounds. When the soft aggregate is re-dispersed to prepare an aqueous dispersion thereof, the water content is preferably in the range of 20 to 99% by mass and, more preferably from 30 to 95% by mass, of the aqueous dispersion respectively. The content of the water-soluble organic solvent is preferably in the range of 0.1 to 50% by mass and, more preferably from 0.1 to 30% by mass of the aqueous dispersion respectively.

When the aforementioned water-soluble organic solvent is added, if necessary, a stirrer, a mixer, and a dispersing machine may be used. When a paste or slurry of organic pigments which is high in water content is used, addition of water is unnecessary. Further, heating, cooling, distillation or the like may be conducted for the purpose of enhancing efficiency of re-dispersion and another purpose of removing unnecessary water-soluble organic solvents or an excessive alkali or the like.

If necessary, various kinds of additives, aids or the like may be added to the aqueous dispersion of the present invention. One of the additives is a dispersion stabilizing agent that is able to stably disperse a pigment in a solvent. As the dispersion stabilizing agent, it is possible to use a resin having both a hydrophilic portion and a hydrophobic portion, or a surfactant. Examples of the resin having both a hydrophilic portion and a hydrophobic portion include copolymers of a hydrophilic monomer component and a hydrophobic monomer component. Examples of the hydrophilic monomer include acrylic acid, methacrylic acid, maleic acid, fumaric acid, monoesters of the foregoing carboxylic acids, vinyl sulfonic acid, styrene sulfonic acid, vinyl alcohol, acryl amide, and methacryloxyethylphosphate. Examples of the hydrophobic monomer include styrene derivatives such as styrene, α-methylstyrene; vinylcyclohexane, vinylnaphtharene derivatives, acrylic acid esters, and methacrylic acid esters. As the copolymers, it is possible to use various types of copolymers such as random, block or graft copolymers. As a matter of course, the present invention should not be construed as being limited to the above-described hydrophilic monomers and hydrophobic monomers.

As the surfactant, an anionic, nonionic, cationic, or amphoteric surfactant can be used. Examples of the anionic surfactant include fatty acid salts, alkylsulfate ester salts, alkylaryl sulfonic acid salts, alkyldiarylether di sulfonic acid salts, dialkylsulfosuccinic acid salts, alkylphosphoric acid salts, naphthalene sulfonic acid formalin condensate, polyoxyethylene alkylphosphate ester salts, and glycerol borate fatty acid esters. Examples of the nonionic surfactants include polyoxyethylene alkylethers, polyoxyethyleneoxypropylene block copolymers, sorbitan fatty acid esters, glycerol fatty acid esters, polyoxyethylene fatty acid esters, polyoxyethylene alkylamines, fluorine-based surfactants, and silicon-based surfactants. Examples of the cationic surfactant include alkylamine salts, quaternary ammonium salts, alkylpyridinium salts, and alkylimidazolium salts. Examples of the amphoteric surfactants include alkyl betaines, alkylamineoxides, and phosphatidylcholine.

The aqueous dispersion of the present invention is preferably used as a recording liquid, and especially preferably as an ink for inkjet recording. At this time, if necessary, an aqueous solvent may be added thereto. The aqueous solvent is used especially in order to prevent drying at the ink nozzle portion and solidification of ink, and used singly or in a combination of two or more. A content of the aqueous solvent is preferably from 0.1% by mass to 60% by mass, and more preferably from 1% by mass to 40% by mass with respect to the total amount of the ink.

When the aqueous dispersion of the present invention is used as a recording liquid or an ink, it is preferable that increase in viscosity of the dispersion is suppressed. For example, it is preferable that the viscosity is kept in the range of from 0.8 mPa·s to 10 mPa·s. Please note that the viscosity used in the present invention is a value measured at 25° C. by using a vibration type Model VM-100A-L (trade name, manufactured by Yamaichi Electronics Co., Ltd.), unless otherwise indicated.

Taking as an example the case where the aqueous dispersion is used as an ink, it is possible to add to the ink other additives such as a pH adjustor that is used to attain stabilization of ink and stability of the ink in the piping of a recording apparatus; a penetrating agent that accelerates penetration of an ink into a recording medium, thereby to quicken a time of an apparent drying; a mildew-proofing agent that suppresses a propagation of mildew in the ink; a chelating agent that seals off metal ions in the ink, thereby to suppress precipitation of the metals at the nozzle portion and of insoluble materials in the ink; a defoaming agent that suppresses a generation of foam during circulation or transfer of the recording liquid, or at the time when the recording liquid is prepared; an antioxidant; a mold-proofing agent; a viscosity adjustor; an electrically conducting agent; and an ultraviolet absorber.

The recording liquid of the present invention may be prepared, for example, by adding any of the above-described components and uniformly dissolving or dispersing them. Further, when excessive amounts of polymer compounds or additives are contained therein, they may be properly removed by a method such as centrifugal separation or dialysis, to re-prepare the recording liquid.

The recording liquid of the present invention may be used in various image-forming methods and apparatuses, such as a variety of printing methods, inkjet process, and electrophotography. Imaging can be performed according to an image-forming method using the apparatuses. Further, according to the inkjet process, fine patterns may be formed, or dosage of drugs may be conducted.

The image-forming method of the present invention is a method of forming an image by using the recording liquid having excellent properties that are described above. The image-forming method of the present invention is a method of forming an image preferably by discharging the above-described recording liquid from an ink discharge portion, thereby to apply the recording liquid onto a medium to be recorded.

As the inkjet printer that uses the recording liquid of the present invention, it is possible to use various types of inkjet recording apparatuses such as a piezo inkjet process using a piezoelectric element, or a bubble jet (Registered Trade Mark) process in which an image is recorded by using bubbles that are generated in response to the action of thermal energy.

The inkjet recording apparatus is provided with a means for generating thermal energy that is used to discharge an inkjet ink (for example, electrothermal energy conversion elements, laser light, etc.), so that the inkjet ink can be discharged by the thermal energy. Highly detailed images can be reproduced by using the recording liquid of the present invention. Further, a high quality imaging can be performed. It is preferable that an amount of ink discharged from each of discharge openings of the discharge head of inkjet ink is in the range of from 0.1 picoliters to 100 picoliters.

The recording liquid of the present invention may be also used in an indirect recording apparatus using a recording system in which an ink is once printed on an intermediate transfer element, and then transferred to a recording medium such as a paper. Further, the recording liquid may be also used in a recording apparatus using an intermediate transfer element according to a direct recording system.

The present invention provides an aqueous dispersion containing water-insoluble colorant particles including a uniformly and finely formed pigment, which show excellent dispersibility and which is used for an ink showing a discharge stability and a high fastness to light while suppressing increase in viscosity; a recording liquid, an image-forming method and an image-forming apparatus, each of which uses the aqueous dispersion. Further, the present invention provides a method of producing an aqueous dispersion having the above-described excellent properties with a good efficiency as well as a high purity. The present invention provides an inkjet ink that is obtained by the above-described method of producing an aqueous dispersion.

The aqueous dispersion of the present invention contains water-insoluble colorant particles including a uniformly and finely formed pigment and showing excellent dispersibility. When used as an ink, the aqueous dispersion shows such excellent functions and effects as improvement of both discharge stability and fastness to light while suppressing elevation of viscosity. Further, according to the production method of the present invention, it is possible to prepare the aqueous dispersion showing the above-described excellent properties with no necessity of complicated steps, but in both good efficiency and high purity.

The present invention will be described in more detail based on the following examples, but the invention is not intended to be limited thereto.

EXAMPLES

In the following examples, the terms "part(s)" and "%" are values by mass, unless otherwise specified.

<Average Particle Diameter and Monodispersity>

In the Examples and Comparative Examples described below, unless indicated otherwise, the average particle diameter of the pigment particles is a number-average particle diameter of 300 particles that are measured by using a transmission electron microscope. In this, evaluation of the average particle diameter from observation with the transmission electron microscope (TEM) was conducted by dropping a diluted dispersion (dispersion liquid) onto a Cu 200 mesh to which a carbon film is attached, and then drying the dropped dispersion, and thereafter measuring the major axis of each of 300 particles that are isolated and not piled, from images of the particles photographed to 100,000 times using TEM (1200EX (trade name), manufactured by JEOL Ltd.), thereby calculating an average value as an average particle diameter. Hereinafter, the average particle diameter calculated from TEM observation is described as a TEM average particle diameter.

The monodispersity of pigment particles was a ratio of a volume-average particle diameter Mv to a number-average particle diameter Mn (Mv/Mn). Unless indicated otherwise, the volume-average particle diameter Mv and the number-average particle diameter Mn are measured by using Microtrac (Version 10.1.2-211 BH (trade name), manufactured by NIKKISO CO., LTD) after dilution of a dispersion (dispersion liquid) with ion-exchanged water. The monodispersity of pigment particles was calculated by using these measured values.

<X-Ray Diffraction Measurement>

X-ray diffraction measurement was conducted by using RINT 2500 (trade name) manufactured by Rigaku Industrial Corp. Each dispersion (dispersion liquid) sample was dried by using an evaporator to prepare a powder. The thus-obtained powder was subjected to X-ray diffraction measurement. In each spectrum, a crystallite diameter was calculated from a half width of the peak in the range of 2θ=10 degrees to 70 degrees. The X-ray diffraction analysis was performed by using Cu—Kα1 ray from a cupper target. When the pigment particles had a crystalline structure and their crystallite diameters were measured, the crystallite diameters are shown in Table 1 set forth below. On the other hand, when the pigment particles had no crystalline structure, and their peaks of X-ray Diffraction spectra were too broad to determine a half width of the peak, the crystallite diameter was indicated as "out of measurement (less than 20 Å)" in Table 1 set forth below.

Example 1

5.8 parts by mass of C.I. pigment red 122 and 10 parts by mass of polyvinyl pyrrolidone K25 (trade name, manufactured by TOKYO KASEI KOGYO CO., LTD.) were added to 100 parts by mass of dimethylsulfoxide, at room temperature, and stirred for 2 hours, and allowed to suspend. Thereafter, to the suspension, 28% sodium methoxide methanol solution (manufactured by Wako Pure Chemical Industries) was added gradually to dissolve the pigment. Thereby a deep bluish-purple colored pigment solution was obtained.

The resultant pigment solution was subjected to an ultrasonic treatment, and thereafter introduced from a discharge opening having an inner diameter of 0.8 mm at a flow velocity of 100 cc/min using NP-KX-500 TYPE mass capacity non-pulsation flow pump (trade name, manufactured by NIHON SEIMITSU KAGAKU CO., LTD.) to 500 parts by mass of distilled water while stirring with a stirrer. Resultantly, a transparent and red-tinted pigment dispersion was obtained. The average particle diameter of the pigment dispersion was 29.2 nm in terms of TEM average particle diameter (number-average particle diameter Mn: 30.3 nm). The ratio Mv/Mn, which is an indicator of monodispersity, was 1.22.

Subsequently, hydrochloric acid was added drop-wise to the resultant pigment dispersion to adjust pH to 3.5. Thereby pigment particles were softly aggregated from the dispersion. Thereafter, the thus-obtained aggregate was filtrated under reduced pressure by using a membrane filter (average pore size 0.2 μm), and then washed twice with ion-exchanged water. Thereby a paste of dispersion containing desalted and solvent-removed pigment particles was obtained.

Subsequently, 100 parts by mass of ethyl lactate was added to the resultant paste. The resultant mixture was stirred and subjected to an ultrasonic treatment. Thereafter, the thus-obtained aggregate was filtrated under reduced pressure by using a membrane filter (average pore size 0.2 μm), thereby a paste of dispersion containing pigment particles was obtained. The resultant paste was washed with ion-exchanged water and filtrated again under reduced pressure by using a membrane filter (average pore size 0.2 μm), thereby a paste A of dispersion containing pigment particles was obtained.

Subsequently, 0.3 parts by mass of sodium oleic acid was added to 3 parts by mass of the paste, and then ion-exchanged water was added to the paste so as to make the pigment content of 10%. The resultant paste was subjected to ultrasonic treatment, to obtain a pigment dispersion A containing pigment particles having a crystalline structure (see Table 1 set forth below). The average particle diameter of the dispersed particles of the pigment dispersion A was 29.4 nm in terms of TEM average particle diameter (number-average particle diameter Mn: 31.3 nm). The ratio Mv/Mn, which is an indicator of monodispersity, was 1.25. After storage of the pigment dispersion A for 2 weeks at 60° C., no change of particle diameter was observed and no sediment was observed. The dispersion in which neither change of the particle diameter nor sediment was observed under the above-described conditions was evaluated as being rank 3 in terms of dispersion stability. In contrast, as described below, the dispersion in which a slight increase of the average particle diameter was observed, but no sediment was observed under the same conditions, was evaluated as being rank 2. Similarly, the dispersion in which a sediment was observed and which was not transparent but turbid was evaluated as being rank 1.

Example 2

A pigment dispersion B having a pigment content of 10% and containing pigment particles with a crystalline structure was prepared in the same manner as in Example 1, except that ethyl lactate was replaced by acetone (see Table 1 set forth below). The average particle diameter of the pigment dispersion B was 29.8 nm in terms of TEM average particle diameter (number-average particle diameter Mn: 31.2 nm). The ratio Mv/Mn, which is an indicator of monodispersity, was 1.22. After storage of the pigment dispersion B for 2 weeks at 60° C., no change of particle diameter was observed and no sediment was observed.

Example 3

5.8 parts by mass of C.I. pigment red 122 and 11 parts by mass of a copolymer of methylmethacrylate/ethylacrylate/acrylic acid (5/4/1 in molar ratio) (acid number: 60, molecular weight: 32,000) as a dispersing agent were added to 100 parts by mass of dimethylsulfoxide at room temperature and stirred for 2 hours, and allowed to suspend. Thereafter, to the suspension, a 28% sodium methoxide methanol solution (a product of Wako Pure Chemical Industries) was added gradually to dissolve the pigment. Thereby a deep bluish-purple colored pigment solution was obtained.

In the same manner as in Example 1, the resultant pigment solution was subjected to an ultrasonic treatment and thereafter introduced to 500 parts by mass of distilled water being stirred with a stirrer. Resultantly, a transparent and red-tinted pigment dispersion was obtained. The average particle diameter of the pigment dispersion was 30.1 nm in terms of TEM average particle diameter (number-average particle diameter Mn: 30.8 nm). The ratio Mv/Mn, which is an indicator of monodispersity, was 1.41.

Subsequently, hydrochloric acid was added drop-wise to the resultant pigment dispersion to adjust pH to 3.5. Thereby pigment particles were aggregated from the dispersion. Thereafter, the thus-obtained aggregate was filtrated under reduced pressure by using a membrane filter (average pore size 0.2 μm), and then washed twice with ion-exchanged water. Thereby a paste of dispersion containing desalted and solvent-removed pigment particles was obtained.

Subsequently, to the paste, 100 parts by mass of ethyl lactate was added and washed. After further agitation and ultrasonic treatment, filtration under reduced pressure using a membrane filter (average pore size 0.2 μm) was conducted, to obtain a paste of dispersion containing pigment particles. Thereafter, the paste was washed with ion-exchanged water and then filtrated again under reduced pressure by using a membrane filter (average pore size 0.2 μm), to obtain paste C of dispersion containing pigment particles.

Subsequently, potassium hydroxide was added to the paste C, and then ion-exchanged water was added and stirred for 1 hour. Pigment dispersion C having a pigment content of 10% and pH of 9.5 and containing pigment particles having a crystalline structure was obtained (see Table 1 set forth below). The average particle diameter of dispersed particles of the pigment dispersion C was 29.3 nm in terms of TEM average particle diameter (number-average particle diameter Mn: 30.7 nm). The ratio Mv/Mn, which is an indicator of monodispersity, was 1.44. After storage of the pigment dispersion C for 2 weeks at 60° C., a slight increase of average particle diameter was observed, but no sediment was observed.

Comparative Example 1

5.8 parts by mass of C.I. pigment red 122 and 11 parts by mass of a copolymer of methylmethacrylate/ethylacrylate/acrylic acid (5/4/1 in molar ratio) (acid number: 60, molecular weight: 32,000) as a dispersing agent were added to 100 parts by mass of dimethylsulfoxide at room temperature and stirred for 2 hours, and allowed to suspend. Thereafter, to the suspension, a 28% sodium methoxide methanol solution (a product of Wako Pure Chemical Industries) was added gradually to dissolve the pigment. Thereby a deep bluish-purple colored pigment solution was obtained.

In the same manner as in Example 1, the resultant pigment solution was subjected to an ultrasonic treatment and thereafter introduced to 500 parts by mass of distilled water being stirred with a stirrer. Resultantly, a transparent and red-tinted pigment dispersion was obtained. The average particle diameter of the pigment dispersion was 30.1 nm in terms of TEM average particle diameter (number-average particle diameter Mn: 30.8 nm). The ratio Mv/Mn, which is an indicator of monodispersity, was 1.45. The resultant dispersion was heated up to 90° C. at inner temperature and kept at 90° C. for 2 hours, and thereafter cooled down to room temperature.

Subsequently, hydrochloric acid was added drop-wise to the resultant pigment dispersion to adjust pH to 3.5. Thereby pigment particles were aggregated from the dispersion. Thereafter, the thus-obtained aggregate was filtrated under reduced pressure by using a membrane filter (average pore size 0.2 µm), and then washed twice with ion-exchanged water. Thereby a paste D of dispersion containing desalted and solvent-removed pigment particles was obtained.

Subsequently, potassium hydroxide was added to the paste D, and then ion-exchanged water was added and stirred for 1 hour. Pigment dispersion D having a pigment content of 10% and pH of 9.5 and containing pigment particles having no crystalline structure was obtained (see Table 1 set forth below). The average particle diameter of dispersed particles of the pigment dispersion D was 32.2 nm in terms of TEM average particle diameter (number-average particle diameter Mn: 34.3 nm). The ratio Mv/Mn, which is an indicator of monodispersity, was 1.50. After storage of the pigment dispersion D for 2 weeks at 60° C., a slight increase of particle diameter was observed, but no sediment was observed.

Comparative Example 2

A pigment solution was obtained in the same manner as in Example 1, except that polyvinyl pyrrolidone used in Example 1 was omitted. As soon as the pigment solution was introduced, the liquid turned to a red suspension. As a result, a transparent dispersion was not obtained, and a sediment was observed. In the Comparative Example 2, the X-ray diffraction measurement was not conducted owing to formation of the sediment.

Example 4

5.8 parts by mass of C.I. pigment yellow 74 and 10 parts by mass of polyvinyl pyrrolidone K25 (trade name, manufactured by TOKYO KASEI KOGYO CO., LTD.) were added to 100 parts by mass of dimethylsulfoxide, at room temperature, and stirred for 2 hours, and allowed to suspend. Thereafter, to the suspension, 28% sodium methoxide methanol solution (manufactured by Wako Pure Chemical Industries) was added gradually, to dissolve the pigment. Thereby a red colored pigment solution was obtained.

The resultant pigment solution was subjected to an ultrasonic treatment, and thereafter introduced from a discharge opening having an inner diameter of 0.8 mm at a flow velocity of 100 cc/min using NP-KX-500 TYPE mass capacity non-pulsation flow pump (trade name, manufactured by NIHON SEIMITSU KAGAKU CO., LTD.) to 500 parts by mass of distilled water while stirring with a stirrer. Resultantly, a transparent and yellow-tinted pigment dispersion was obtained. The average particle diameter of the pigment dispersion was 34.8 nm in terms of TEM average particle diameter (number-average particle diameter Mn: 35.8 nm). The ratio Mv/Mn, which is an indicator of monodispersity, was 1.23.

Subsequently, hydrochloric acid was added drop-wise to the resultant dispersion to adjust pH to 2.8. Thereby pigment particles were softly aggregated from the dispersion. Thereafter, the thus-obtained aggregate was filtrated under reduced pressure by using a membrane filter (average pore size 0.2 µM), and then washed twice with ion-exchanged water. Thereby a paste of dispersion containing desalted and solvent-removed pigment particles was obtained.

Subsequently, 100 parts by mass of ethyl lactate was added to the resultant paste. The resultant mixture was stirred and subjected to an ultrasonic treatment. Thereafter, the thus-obtained aggregate was filtrated under reduced pressure by using a membrane filter (average pore size 0.2 µm), thereby a paste of dispersion containing pigment particles was obtained. The resultant paste was washed with ion-exchanged water and filtrated again under reduced pressure by using a membrane filter (average pore size 0.2 µm), thereby a paste E of dispersion containing pigment particles was obtained.

Subsequently, 0.3 parts by mass of sodium oleic acid was added to 3 parts by mass of the paste, and then ion-exchanged water was added to the paste so as to make the pigment content of 10%. The resultant paste was subjected to ultrasonic treatment, to obtain a pigment dispersion E containing pigment particles having a crystalline structure (see Table 1 set forth below). The average particle diameter of the dispersed particles of the pigment dispersion E was 34.2 nm in terms of TEM average particle diameter (number-average particle diameter Mn: 35.4 nm). The ratio Mv/Mn, which is an indicator of monodispersity, was 1.24. After storage of the pigment dispersion E for 2 weeks at 60° C., no change of particle diameter was observed and no sediment was observed.

Example 5

A pigment dispersion F containing pigment particles with a crystalline structure was prepared in the same manner as in Example 1, except that ethyl lactate was replaced by acetone (see Table 1 set forth below). The average particle diameter of dispersed particles of the pigment dispersion F was 28.8 nm in terms of TEM average particle diameter (number-average particle diameter Mn: 29.4 nm). The ratio of Mv/Mn, which is an indicator of monodispersity, was 1.23. After storage of the pigment dispersion F for 2 weeks at 60° C., no change of particle diameter was observed and no sediment was observed.

Example 6

5.8 parts by mass of C.I. pigment yellow 74 and 5 parts by mass of a copolymer of styrene/acrylic acid (acid number:

250, molecular weight: 15,000) were added to 100 parts by mass of dimethylsulfoxide at room temperature and stirred for 2 hours, and allowed to suspend. Subsequently, a 28% sodium methoxide methanol solution manufactured by Wako Pure Chemical Industries was gradually added to dissolve the pigments. Thereby a reddish purple pigment solution was obtained. Further, a 28% sodium methoxide methanol solution was gradually added until the color of the pigment solution became reddish purple. Thereafter, to the reddish purple pigment solution, distilled water was gradually added drop-wise while stirring the pigment solution, and addition of distilled water was stopped at the time when the entire pigment solution turned to red.

The resultant pigment solution was subjected to an ultrasonic treatment, and thereafter introduced from a discharge opening having an inner diameter of 0.8 mm at a flow velocity of 100 cc/min using NP-KX-500 TYPE mass capacity non-pulsation flow pump (trade name, manufactured by NIHON SEIMITSU KAGAKU CO., LTD.) to 500 parts by mass of distilled water while stirring with a stirrer. Resultantly, a transparent and yellow-tinted pigment dispersion was obtained. The average particle diameter of the pigment dispersion was 25.2 nm in terms of TEM average particle diameter (number-average particle diameter Mn: 26.5 nm). The ratio Mv/Mn, which is an indicator of monodispersity, was 1.44.

Subsequently, hydrochloric acid was added drop-wise to the resultant dispersion to adjust pH to 2.75. Thereby pigment particles were softly aggregated from the dispersion. Thereafter, the thus-obtained aggregate was filtrated under reduced pressure by using a membrane filter (average pore size 0.2 µm), and then washed twice with ion-exchanged water. Thereby a paste of dispersion containing desalted and solvent-removed pigment particles was obtained.

Subsequently, 100 parts by mass of ethyl lactate was added to the resultant paste. The resultant mixture was stirred and subjected to an ultrasonic treatment. Thereafter, the thus-obtained aggregate was filtrated under reduced pressure by using a membrane filter (average pore size 0.2 µm), thereby a paste of dispersion containing pigment particles was obtained. The resultant paste was washed with ion-exchanged water and filtrated again under reduced pressure by using a membrane filter (average pore size 0.2 µm), thereby a paste G of dispersion containing pigment particles was obtained.

Subsequently, potassium hydroxide was gradually added to the paste, and then ion-exchanged water was added so that the content of the pigment would be 10% with respect to the paste. After ultrasonic treatment, a pigment dispersion G containing pigment particles having a crystalline structure was obtained (see Table 1 set forth below). At this time, pH of the pigment dispersion G was 9.5. The average particle diameter of the pigment dispersion G was 26.3 nm in terms of TEM average particle diameter (number-average particle diameter Mn: 27.9 nm). The ratio Mv/Mn, which is an indicator of monodispersity, was 1.41. After storage at 60° C. for 1 week, neither change of the particle diameter nor visual change of color tint was observed. Further, no sediment was found.

Comparative Example 3

5.8 parts by mass of C.I. pigment yellow 74 and 10 parts by mass of polyvinyl pyrrolidone K25 (trade name, manufactured by TOKYO KASEI KOGYO CO., LTD.) were added to 100 parts by mass of dimethylsulfoxide, at room temperature, and stirred for 2 hours, and allowed to suspend. Thereafter, to the suspension, 28% sodium methoxide methanol solution (manufactured by Wako Pure Chemical Industries) was added gradually, to dissolve the pigment. Thereby a red colored pigment solution was obtained.

The resultant pigment solution was subjected to an ultrasonic treatment, and thereafter introduced from a discharge opening having an inner diameter of 0.8 mm at a flow velocity of 100 cc/min using NP-KX-500 TYPE mass capacity non-pulsation flow pump (trade name, manufactured by NIHON SEIMITSU KAGAKU CO., LTD.) to 500 parts by mass of distilled water while stirring with a stirrer. Resultantly, a transparent and yellow-tinted pigment dispersion was obtained. The average particle diameter of the pigment dispersion was 36.8 nm in terms of TEM average particle diameter (number-average particle diameter Mn: 36.2 nm). The ratio Mv/Mn, which is an indicator of monodispersity, was 1.29.

Subsequently, hydrochloric acid was added drop-wise to the resultant pigment dispersion to adjust pH to 2.75. Thereby pigment particles were softly aggregated from the dispersion. Thereafter, the thus-obtained aggregate was filtrated under reduced pressure by using a membrane filter (average pore size 0.2 µm), and then washed twice with ion-exchanged water. Thereby a paste of dispersion containing desalted and solvent-removed pigment particles was obtained.

Subsequently, 0.3 parts by mass of sodium oleic acid was added to 3 parts by mass of the paste, and then ion-exchanged water was added to the paste so as to make the pigment content of 10%. The resultant paste was subjected to ultrasonic treatment, to obtain a pigment dispersion H containing pigment particles having no crystalline structure (see Table 1 set forth below). The average particle diameter of dispersed particles of the pigment dispersion H was 37.2 nm in terms of TEM average particle diameter (number-average particle diameter Mn: 37.9 nm). The ratio Mv/Mn, which is an indicator of monodispersity, was 1.28. After storage of the pigment dispersion H for 1 week at 60° C., no change of average particle diameter was observed, and no sediment was observed.

Comparative Example 4

5.8 part by mass of C.I. pigment yellow 74 and 5 parts by mass of a copolymer of styrene/acrylic acid (acid number: 250, molecular weight: 15,000) were added to 100 parts by mass of dimethylsulfoxide at room temperature and stirred for 2 hours, and allowed to suspend. Subsequently, a 28% sodium methoxide methanol solution manufactured by Wako Pure Chemical Industries was gradually added to dissolve the pigments. Thereby a reddish purple red pigment solution was obtained. Further, a 28% sodium methoxide methanol solution was gradually added until the color of the pigment solution became reddish purple. Thereafter, to the reddish purple pigment solution, distilled water was gradually added drop-wise while stirring the pigment solution, and addition of distilled water was stopped at the time when the entire pigment solution turned to red.

The resultant pigment solution was subjected to an ultrasonic treatment, and thereafter introduced from a discharge opening having an inner diameter of 0.8 mm at a flow velocity of 100 cc/min using NP-KX-500 TYPE mass capacity non-pulsation flow pump (trade name, manufactured by NIHON SEIMITSU KAGAKU CO., LTD.) to 500 parts by mass of distilled water while stirring with a stirrer. Resultantly, a transparent and yellow-tinted pigment dispersion was obtained. The average particle diameter of the pigment dispersion was 38.2 nm in terms of TEM average particle diameter (number-average particle diameter Mn: 38.6 nm). The ratio Mv/Mn, which is an indicator of monodispersity, was 1.42. The resultant dispersion was heated up to 90° C. at inner temperature and stood at 90° C. for 2 hours, and thereafter cooled down to room temperature.

Subsequently, hydrochloric acid was added drop-wise to the resultant pigment dispersion to adjust pH to 2.75. Thereby pigment particles were softly aggregated from the pigment dispersion. Thereafter, the thus-obtained aggregate was filtrated under reduced pressure by using a membrane filter (average pore size 0.2 μm), and then washed twice with ion-exchanged water. Thereby a paste of dispersion containing desalted and solvent-removed pigment particles was obtained.

Subsequently, potassium hydroxide was gradually added to the paste, and then ion-exchanged water was added so that the content of the pigment would be 10% with respect to the paste. After ultrasonic treatment, a pigment dispersion I containing pigment particles having no crystalline structure was obtained (see Table 1 set forth below). At this time, pH of the pigment dispersion I was 9.5. The average particle diameter of the pigment dispersion I was 39.2 nm in terms of TEM average particle diameter (number-average particle diameter Mn: 38.3 nm). The ratio Mv/Mn, which is an indicator of monodispersity, was 1.45. After storage of the pigment dispersion I at 60° C. for 1 week, no change of the particle diameter and no sediment were observed.

Comparative Example 5

5.8 parts by mass of C.I. pigment yellow 74 and 10 parts by mass of polyvinyl pyrrolidone K25 (trade name, manufactured by TOKYO KASEI KOGYO CO., LTD.) were added to 100 parts by mass of dimethylsulfoxide, at room temperature, and stirred for 2 hours, and allowed to suspend. Thereafter, to the suspension, 28% sodium methoxide methanol solution (manufactured by Wako Pure Chemical Industries) was added gradually to dissolve the pigment. Thereby a reddish purple colored pigment solution was obtained.

The resultant pigment-solution was subjected to an ultrasonic treatment, and thereafter introduced from a discharge opening having an inner diameter of 0.8 mm at a flow velocity of 100 cc/min using NP-KX-500 TYPE mass capacity non-pulsation flow pump (trade name, manufactured by NIHON SEIMITSU KAGAKU CO., LTD.) to 500 parts by mass of distilled water while stirring with a stirrer. Resultantly, a transparent and yellow-tinted pigment dispersion was obtained. The average particle diameter of the pigment dispersion was 35.6 nm in terms of TEM average particle diameter (number-average particle diameter Mn: 35.2 nm). The ratio Mv/Mn, which is an indicator of monodispersity, was 1.28. The resultant dispersion liquid was heated up to 90° C. at inner temperature and stood at 90° C. for 2 hours, and thereafter cooled down to room temperature. The pigment dispersion was allowed to stand for 1 week. After that, discoloration was observed visibly. In the Comparative Example 5, the X-ray diffraction measurement was not conducted owing to observation of the discoloration.

<Viscosity Measurement of Dispersion>

A viscosity of the pigment dispersion A prepared in Example 1 was measured at 25° C. by using vibration type Model VM-100A-L (trade name) manufactured by Yamaichi Electronics Co., Ltd. Similarly, a viscosity of each of the pigment dispersions B to I was also measured. Evaluation was performed according to the following criterion:

| Rank | Viscosity |
| --- | --- |
| 3: | 0.8 mPa · s or more to less than 3 mPa · s |
| 2: | 3 mPa · s or more to 10 mPa · s |
| 1: | higher than 10 mPa · s |

However, viscosity measurement was not conducted in Comparative Example 2 owing to formation of the sediment, and in Comparative example 5 owing to discoloration of the dispersion sample.

TABLE 1

| | Pigment dispersion | TEM particle diameter (nm) | Mv/Mn | Crystallite diameter | Dispersion stability | Viscosity | Remarks |
| --- | --- | --- | --- | --- | --- | --- | --- |
| Example 1 | A | 29.4 | 1.25 | 250 Å | 3 | 3 | |
| Example 2 | B | 29.8 | 1.22 | 238 Å | 3 | 2 | |
| Example 3 | C | 29.3 | 1.44 | 215 Å | 2 | 3 | |
| Comparative example 1 | D | 32.2 | 1.50 | Out of measurement (less than 20 Å) | 2 | 1 | |
| Comparative example 2 | — | — | — | — | 1 | — | Presence of Sediment |
| Example 4 | E | 34.2 | 1.24 | 298 Å | 3 | 3 | |
| Example 5 | F | 28.8 | 1.23 | 238 Å | 3 | 2 | |
| Example 6 | G | 26.3 | 1.41 | 212 Å | 3 | 3 | |
| Comparative example 3 | H | 37.2 | 1.28 | Out of measurement (less than 20 Å) | 3 | 1 | |
| Comparative example 4 | I | 39.2 | 1.43 | Out of measurement (less than 20 Å) | 3 | 1 | |
| Comparative example 5 | — | — | — | — | 1 | — | Appearance of Discoloration |

Herein, the symbol "—" in the above Table indicates no measurement was conducted.

<Preparation of Ink Composition>

50 parts by mass of the pigment dispersion A prepared in Example 1 was mixed with 8.5 parts by mass of diethylene glycol, 20 parts by mass of glycerol, 0.8 parts by mass of OLFINE E 1010 (manufacture by Nissin Chemical Industry Co., Ltd.), and 20.7 parts by mass of ion-exchanged water, to obtain an ink composition A.

Ink compositions B to I were also obtained in the same manner as the ink composition A, except that the pigment dispersion A was replaced by pigment dispersions B to I, respectively.

<Evaluation of Light Fastness>

Each of the ink compositions A to I was charged into a cartridge of an inkjet printer PX-G930 manufactured by Seiko-Epson. For evaluation, an image was printed on an inkjet paper (a photographic base paper "KOTAKU (Gloss)" manufactured by Seiko-Epson).

After naturally drying the printed article in air for 24 hours, an image density Ci was measured by using Gretag Spectrolino (trade name, manufactured by Gretag). After Ci measurement, xenon light (100,000 lux) was irradiated to the image for 28 days without break by using a weather meter manufactured by Atlas. Thereafter, the image density was measured again to get image density Cf. From these measured densities, a dye residual rate (%), Ci/Cf×100, was calculated for evaluation. The evaluation was performed at a portion where a reflection density was 1 before xenon irradiation. Light fastness was ranked on the basis of the dye residual rate according to the following criterion:

| Rank | Dye Residual Rate |
| --- | --- |
| 3: | 85% or more |
| 2: | 70% or more, but less than 85% |
| 1: | less than 70% |

<Evaluation of Discharging Property>

Each of the ink compositions A to I that were prepared as described above was charged into a cartridge of an inkjet printer PX-G930 (manufactured by Seiko-Epson). Using the inkjet printer, a solid image (reflection density: 1.0) was printed at the whole surface of an inkjet paper (a photographic base paper "KOTAKU (Gloss)" manufactured by Seiko-Epson) to count numbers of "white streaks" generated during print. Evaluation of discharging property was performed according to the criterion as set below:

3: There is no generation of white streaks (non-printed area) all over the printing surface.

2: Generation of white streaks is slightly observed, which is no problem in practice.

1: Generation of white streaks is frequently observed all over the printing surface, which is not an allowable quality in practice.

The results of evaluation are shown in Table 2.

TABLE 2

| | Light fastness | Discharging property | Remarks |
| --- | --- | --- | --- |
| Ink composition A | 3 | 3 | Example 1 |
| Ink composition B | 3 | 2 | Example 2 |
| Ink composition C | 3 | 3 | Example 3 |
| Ink composition D | 1 | 1 | Comparative example 1 |
| Ink composition E | 3 | 3 | Example 4 |
| Ink composition F | 2 | 2 | Example 5 |
| Ink composition G | 2 | 3 | Example 6 |
| Ink composition H | 1 | 1 | Comparative example 3 |
| Ink composition I | 1 | 1 | Comparative example 4 |

From the above-described results, it is understood that the aqueous dispersion of the present invention is a dispersion of water-insoluble colorant particles showing excellent dispersion stability owing to suppressed aggregation, even though the dispersion contains fine particles with a size in the order of nanometer. It is also understood that the aqueous dispersion of the present invention is an aqueous dispersion having excellent properties in which the particle diameter distribution of the fine particles is monodisperse, viscosity is maintained at a low level in spite of high concentration, and elevation of viscosity has been suppressed. Further, the aqueous dispersion of the present invention, though it contains nanometer-sized fine particles, enables to obtain a recording liquid having excellent light fastness, thereby the present invention provides inkjet recording liquids having excellent discharge property in particular.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An aqueous dispersion, comprising:
   a plurality of particles of a water-insoluble colorant containing at least one pigment, with the particles being dispersed in a medium containing therein both water and a dispersing agent,
   wherein the water-insoluble colorant has a crystalline structure with a crystallite diameter of 20 Å to 400 Å, and an average particle diameter of the particles is in a range of from 5 nm to 40 nm, and a monodispersity of the particles is 1.5 or less.

2. The aqueous dispersion as claimed in claim 1, wherein the water-insoluble colorant is a quinacridone-series pigment.

3. A recording liquid comprising:
   an aqueous dispersion including a plurality of particles of a water-insoluble colorant containing at least one pigment, with the particles being dispersed in a medium containing therein both water and a dispersing agent;
   wherein the water-insoluble colorant has a crystalline structure with a crystallite diameter of 20 Å to 400 Å, and an average particle diameter of the particles is in a range of from 5 nm to 40 nm, and a monodispersity of the particles is 1.5 or less; and
   wherein the water-insoluble colorant is contained in an amount of from 0.1% by mass to 15% by mass of the recording liquid.

4. The recording liquid as claimed in claim 3, wherein the recording liquid is an inkjet recording liquid.

5. An image-forming method, comprising:
   forming a recording liquid prepared from an aqueous dispersion including a plurality of particles of a water-insoluble colorant containing at least one pigment, with the particles being dispersed in a medium containing therein both water and a dispersing agent;
   wherein the water-insoluble colorant has a crystalline structure with a crystallite diameter of 20 Å to 400 Å, and an average particle diameter of the particles is in a range of from 5 nm to 40 nm, and a monodispersity of the particles is 1.5 or less; and
   wherein the water-insoluble colorant is contained in an amount of from 0.1% by mass to 15% by mass of the recording liquid; and
   applying the recording liquid to a medium, thereby recording an image.

6. An image-forming apparatus, comprising:
   a recording liquid prepared from an aqueous dispersion including a plurality of particles of a water-insoluble colorant containing at least one pigment, with the particles being dispersed in a medium containing therein both water and a dispersing agent;

wherein the water-insoluble colorant has a crystalline structure with a crystallite diameter of 20 Å to 400 Å, and an average particle diameter of the particles is in a range of from 5 nm to 40 nm, and a monodispersity of the particles is 1.5 or less; and wherein the water-insoluble colorant is contained in an amount of from 0.1% by mass to 15% by mass of the recording liquid; and a means for applying the recording liquid to a medium, thereby to record an image.

7. The aqueous dispersion as claimed in claim 1, wherein the water-insoluble colorant has a crystalline structure with a crystallite diameter of 20 Å to 300 Å.

8. The aqueous dispersion as claimed in claim 1, which is prepared by the method including:
 (i) a step of dissolving a water-insoluble colorant containing at least one pigment, in an aprotic water-soluble organic solvent containing a dispersing agent, in the presence of an alkali, to prepare a solution thereof,
 (ii) a step of mixing the resultant solution with an aqueous solvent, to prepare a dispersion in which particles of the water-insoluble colorant are dispersed in a medium containing water,
 (iii) a step of forming a soft aggregate containing the water-insoluble colorant particles from said dispersion, and then separating or concentrating the soft aggregate from the dispersion,
 (iv) a step of filtrating and washing the soft aggregate with a particular organic solvent, and
 (v) a step of re-dispersing the soft aggregate.

9. The aqueous dispersion as claimed in claim 8, wherein the particular organic solvent is an ester-series solvent or a ketone-series solvent.

* * * * *